Nov. 28, 1967  L. SCHULTINK ET AL  3,355,157
TUNNEL FURNACE
Filed Dec. 8, 1965
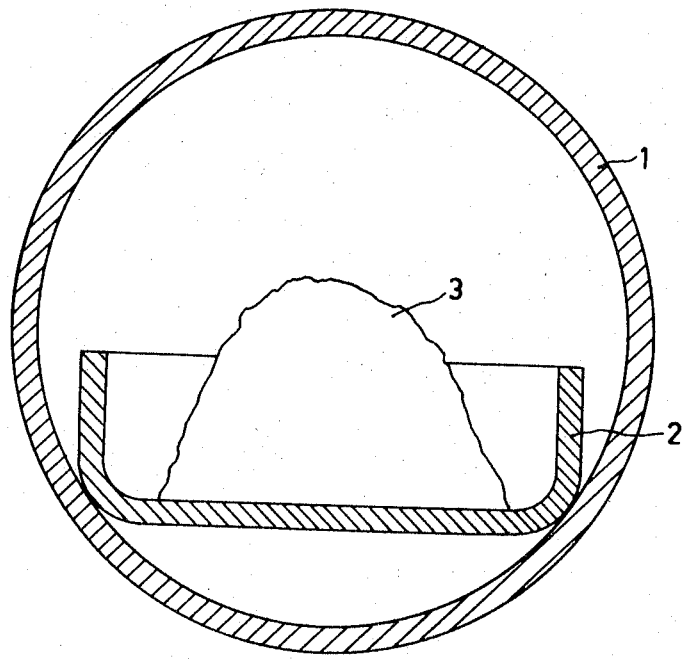
INVENTORS
LUBERTUS SCHULTINK
GRADUS KLOPMAN
BY
AGENT

United States Patent Office 3,355,157
Patented Nov. 28, 1967

3,355,157
TUNNEL FURNACE
Lubertus Schultink, Emmasingel, Eindhoven, and Gradus Klopman, Hengelo, Netherlands, assignors to North American Philips Company, Inc., New York, N.Y., a corporation of Delaware
Filed Dec. 8, 1965, Ser. No. 512,454
Claims priority, application Netherlands, Dec. 31, 1964, 64—15.294
2 Claims. (Cl. 263—6)

ABSTRACT OF THE DISCLOSURE

Apparatus for sintering ceramic material at high temperatures. Refractory materials such as tungsten stick when two members of the material come in contact at a high temperature. One of the tungsten members is thoriated tungsten or at least includes a thoriated tungsten surface in order to eliminate the sticking.

---

The invention relates to a tunnel furnace or muffle in which raw material, for example, alumina or objects made therefrom are contained in one or more holders or boats which are subjected to a thermal treatment, preferably in a reducing atmosphere. For sintering treatment of alumina, the operational temperature is on the order of 1850° C.

In sintering alumina of a high degree of purity, it is necessary, in order to avoid contamination of the alumina to be treated, that the muffle, boat and associated parts of the furnace have a low vapour pressure at the high temperature. A material, which does not become brittle in a reducing atmosphere at this high temperature, is tungsten.

However, if tungsten is used for the parts of the furnace and the holders which slide one along the other, such parts adhere to each other, so that the holders or boats cannot be passed continuously through the furnace.

According to the invention, at least the parts of the furnace which come into sliding or moving contact with each other are made of tungsten and at least one of said parts is made of thoriated tungsten.

The part of thoriated tungsten preferably contains 0.5 to 3% by weight of thorium oxide.

The above and other features, objects and advantages of the present invention will be fully understood from the following description considered in connection with the accompanying illustrative drawing.

Referring to the drawing, reference numeral 1 designates the circular section of a tubular tunnel furnace or muffle having an inner diameter of about 30 mms., a length of about 600 mms. and the wall thickness of about 1.5 mms.

Reference numeral 2 designates a shuttle-like holder or boat having a length of about 150 mms. which is passed by means of a mechanism (not shown) at a constant rate of about 10 cms. an hour through the furnace.

The holder 2 contains, for example, raw material of pure alumina or objects made therefrom, which have to be exposed to a thermal treatment, for example, a sintering.

The furnace 1, is heated by a heating helix (not shown) surrounding the furnace to such a high temperature that a temperature of about 1850° C. prevails in the interior of the furnace. Heating may be carried out in a different way, for example, by direct passage of current, the wall of the furnace serving as an electric conductor. A reducing hydrogen atmosphere is maintained in the interior of the furnace in known manner.

Experiments with a furnace 1 and a holder 2 of pure tungsten showed that these parts stuck or adhered to each other at the contact areas, so that continuous operation was not possible.

It was a surprise to find that sticking is eliminated if the furnace 1 or the holder 2, or at least the parts thereof which come into contact with each other, is made of thoriated tungsten.

Very satisfactory results were obtained with thoriated tungsten containing a quantity of thorium oxide of about 1.5% by weight.

While we have shown and described the preferred embodiment of our invention, it will be understood that the latter may be embodied otherwise than as herein specifically illustrated or described and that in the illustrated embodiment certain changes in the details of construction and in the arrangement of parts may be made without departing from the underlying idea or principle of the invention within the scope of the appended claims.

What is claimed to be new and useful and secured by Letters Patent of the United States is:

1. In a combination a tungsten refractory furnace member and a movable tungsten refractory carrier member slidable on said furnace member wherein at least one of said members is thoriated tungsten whereby sticking of said members at refractory temperature is eliminated.

2. The combination according to claim 1 wherein said at least one thoriated member includes 1.5 to 3.0 percent thorium oxide by weight.

References Cited

UNITED STATES PATENTS

| | | | |
|---|---|---|---|
| 1,675,119 | 6/1928 | Marden | 263—48 |
| 2,431,690 | 12/1947 | Hall et al. | 75—176 |
| 2,640,135 | 5/1953 | Cobine | 75—176 X |

FREDERICK L. MATTESON, Jr., *Primary Examiner.*

JOHN J. CAMBY, *Examiner.*